Nov. 22, 1955     S. S. FOX     2,724,239
FUEL FLOW DISTRIBUTING AND MANIFOLD PRESSURIZING
VALVE FOR DUAL ORIFICE FUEL INJECTION NOZZLES
Filed April 21, 1952
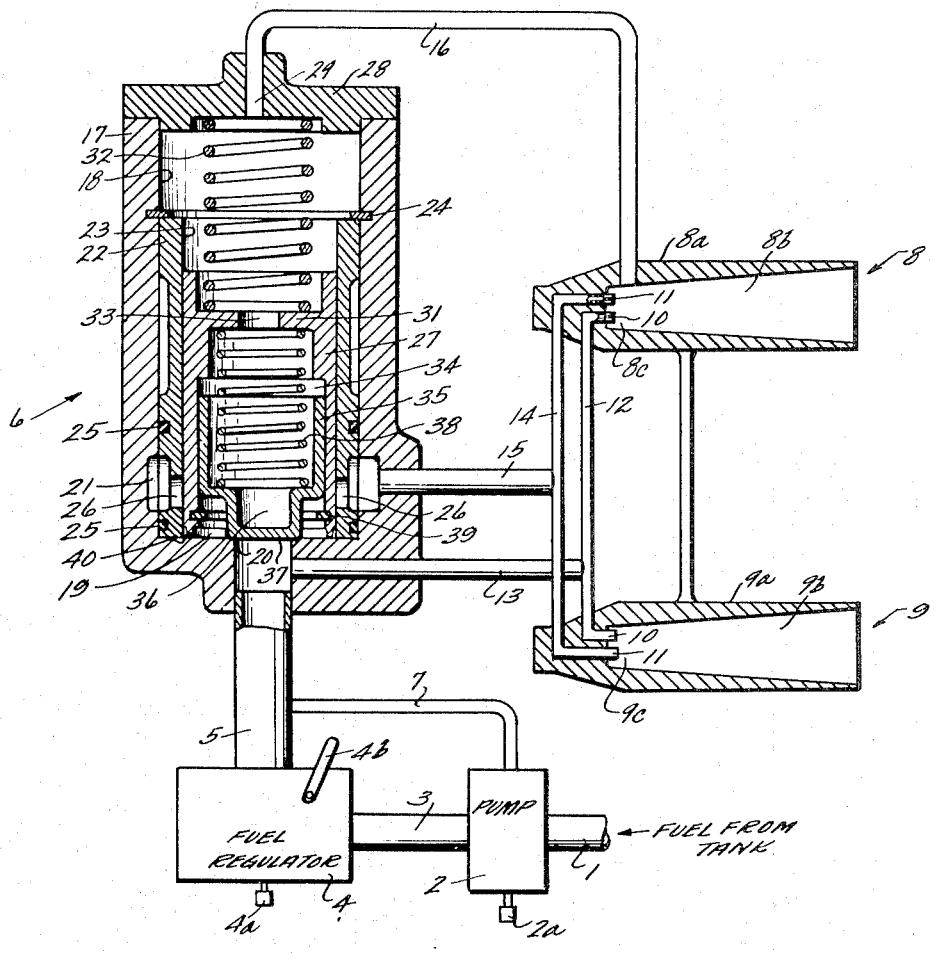
INVENTOR.
SAMUEL S. FOX
BY
HIS ATTORNEYS

United States Patent Office 2,724,239
Patented Nov. 22, 1955

2,724,239

FUEL FLOW DISTRIBUTING AND MANIFOLD PRESSURIZING VALVE FOR DUAL ORIFICE FUEL INJECTION NOZZLES

Samuel S. Fox, Hartford, Conn., assignor to the United States of America as represented by the Secretary of the Air Force Application April 21, 1952, Serial No. 283,444

5 Claims. (Cl. 60—39.28)

This invention relates to fuel flow regulating means and more particularly to a fuel "flow distributing and manifold pressurizing valve for dual orifice fuel injection nozzles" in a gas turbine power plant, having for an object the provision of an automatically operable valve means for dual injection nozzles in which an initial fuel pressure to one of the dual jet orifices actuates the valve means to establish fuel flow to the other of the dual orifices.

A further object is the provision of a valve construction in which a predetermined fuel pressure on fuel supplied to a primary fuel jet orifice actuates the valve means to establish fuel flow through the valve means to a second or main fuel injection jet orifice.

A further object is the provision of a pressure balancing valve including means for supplying a valve balancing pressure from the pressure in the combustion chamber for the dual injection nozzles, to balance the pressure supplied to the fuel injection nozzles by the valve against the combustion chamber pressure to regulate the amount of fuel supplied to one of the dual fuel injection nozzles.

A further object is the provision of fuel flow distributing and manifolding multiple piston valve means for dual fuel injection orifices of gas turbines in which a main piston valve is provided for establishing fuel flow between a pressurized and metered fuel supply and a main fuel injection orifice of the dual injection orifices and includes a piston actuator valve within the main piston valve having a reduced pressure area valve closure head arranged to seat on a cooperating valve seat surrounding a port having communication with the pressurized fuel supply and with the other of the dual injection orifices, said piston actuator valve having a greater operative pressure area adapted to be placed in communication with pressurized fuel supply when unseated for moving the main piston valve to admit metered fuel under pressure to the main orifices when a predetermined fuel pressure becomes operative against the reduced area of the piston actuator valve to unseat the piston actuator valve, said piston actuator valve being in communication, at its side opposite its closure valve head, with the combustion chamber that is supplied with fuel by the dual fuel injection burner orifices, for utilizing the combustion chamber pressure to balance the metered fuel supply pressure, and tend to adjust the piston actuator valve toward its closed position, said construction including spring means for moving the main piston valve toward closed position to interrupt or adjust the fuel flow to the main fuel burner orifice, and resilient means between the main piston valve and the piston actuator valve for moving the piston actuator valve toward its closed position.

A further object is the provision of a control valve device for regulating the fuel flow to a dual orifice fuel injection nozzle of a gas turbine power plant in which the valve device regulates the fuel flow to the secondary nozzles of the dual orifice fuel injection nozzle in accordance with the pressure differential between a metered fuel under pressure to the burner orifices and the combustion chamber pressure.

Other objects and advantages of the invention will become apparent from the following description and accompanying drawing, in which like reference characters refer to like parts, the drawing illustrating somewhat diagrammatically a pair of gas turbine combustion chambers each having dual fuel injection orifices or jets, and discloses my improved valve structure shown in section in combination with the connecting and communicating fuel and pressure supply conduits. Also shown schematically in combination with a fuel supply conduit are a fuel pump having a pump discharge pressure regulator, and a fuel metering regulator.

Referring to the drawing the reference numeral 1 denotes a fuel supply conduit for supplying fuel from any suitable source, such as a fuel tank (not shown). The conduit 1 connects a combined fuel pump and fuel pump discharge pressure regulator device 2, for supplying fuel under a predetermined pressure through a fuel supply conduit 3, to a fuel metering regulator 4. The metering regulator 4 has a fuel discharge outlet conduit 5 for supplying fuel at a predetermined rate, through my improved fuel distributing and manifolding pressurizing valve means, indicated generally at 6. A bypass or return pressure conduit 7 is connected between the conduit 5 and the pressure regulator pump device 2 for regulating the outlet fuel pressure from the pump 2 into the conduit 3 in proportion to the fuel pressure in the conduit 5 from the metering regulator 4. The pressure regulator pump 2 is provided with an adjustment means such as a thumb screw 2a for adjusting the fuel output pressure. The details of this regulator pump 2, 2a are conventional and form no part of the present invention. The fuel metering regulator 4 is also of conventional construction and therefor no specific details thereof are shown, or thought to be necessary. The regulator 4 meters the fuel supplied by the pump 2 under the predetermined pressure through the conduit 3 and is preferably provided with a rate of feed adjustment knob 4a and a control arm or throttle lever 4b for adjusting the normal fuel flow to the primary burners or smaller orifices of a plurality of gas turbine combustion chambers (only two of which are shown for simplicity of illustration) and indicated at 8b and 9b.

The gas turbine units are indicated generally at 8 and 9, each comprising outer shells 8a and 9a each having the combustion chambers 8b and 9b, at the heads of which are located the dual orifice fuel injection burner means 8c and 9c. Each burner or fuel injection means comprises a primary or small burner or fuel discharge orifice 10 and a secondary larger or main fuel discharge burner or orifice 11. The primary orifices 10 are connected together by a manifold 12, the manifold 12 being connected to the metered fuel and pressure supply conduit 5 by a fuel delivery conduit 13, part of which is formed in the valve casing structure of the control valve device 6. The other or main fuel discharge orifices 11 are also connected together by a main fuel delivery manifold 14 which is, in turn, connected to a main fuel delivery conduit 15 extending into the valve casing 6 at one side thereof above its bottom as shown in the drawing. A fluid pressure supply conduit 16 connects the interior of the valve casing at the top to the interior of the combustion chamber 8b at a point adjacent to the primary and secondary fuel delivery orifices 10 and 11. This pressure supply conduit 16, as shown, is connected to only one of the gas turbine combustion chambers, but it is obvious that all of the combustion chambers could be connected to a manifold, and the manifold in turn connected to the conduit 16, if desired, so that the pressure in the conduit 16 would be representative of the average pressure in all of the combustion chambers.

The valve structure comprises a valve casing, preferably cylindrical in shape, indicated at 17, having a cylindrical bore 18 or chamber with an end closure wall 19 having a valve seat 20 surrounding a fuel inlet port disposed in communication with the metered fuel and pressure supply conduit 5.

The side wall of the cylindrical bore or chamber 18 is provided with an annular channel 21 located just above the bottom or end closure 19 and is connected through the main fuel supply conduit 15 to the main fuel jet or burner orifices 11.

A cylindrical sleeve member 22 is fixed in the cylindrical bore 18 of the casing 17 and has a main piston valve cylinder 23 formed therein. The sleeve 22 is retained in place in the bore 18 by a circular snap ring 24 located in an annular groove in the casing bore 18. A pair of sealing gaskets in the form of O rings 25 are provided in the suitable annular grooves formed in the exterior surface of the fixed sleeve 22, above and below the annular chamber 21, the sleeve 22 having fuel outlet ports or openings 26 located between the O ring gaskets 25. A piston sleeve valve member 27 is slidably mounted within the cylinder or bore 23 for movement between a "cutoff" position resting on the end closure wall 19, closing the fuel outlet ports 26, and an "open" position uncovering these ports 26, the upward movement thereof being limited by the head 28 of the cylinder 18 of valve casing 17. The head 28 is provided with a central fluid pressure supply port 29 for receiving pressure from the combustion chamber 8b through the combustion chamber fluid pressure delivery conduit 16.

The piston sleeve valve member 27 has a transverse closure wall or web 31 located below its upper end, providing a spring seat for a compression coil spring 32, the spring being seated at its upper end in an upper spring seat depression formed in the cover 28. The web 31 is apertured at 33 to provide a fluid pressure inlet port to admit combustion chamber pressure through and below the web portion 31.

The piston sleeve valve member 27 is also counter bored from its lower end, below the web 31 as indicated at 34 to receive therein a piston actuator valve 35 of cup shaped cylindrical construction. The piston sleeve valve member is formed with a concentric reduced area tubular extension 36 having a valve head 37 formed on its outer end and arranged to seat on the valve seat 20 of the valve casing 17 for closing the fuel inlet port at the end of the metered fuel supply passage 5 to the interior of the sleeve valve 27 and the larger pressure area of the piston actuator valve.

A compression coil spring 38 is interposed between the web 31 of the piston sleeve valve 27 and an interior shoulder formed in the piston actuator valve 35 by the reduced area portion of the valve head extension 36, and comprises means for yieldably tensioning the piston actuator valve head 37 on the fuel inlet port valve seat 20. The spring 38 is preferably lighter in strength than the spring 32 so as to allow the piston actuator valve 35 to move upwardly off of its seat 20 before any movement of the piston sleeve valve 27 occurs. Independent upward movement of the piston actuator valve 35 within the sleeve valve 27 is limited by impingement of the upper end of the piston actuator valve 35 against the shoulder formed in the sleeve valve 27 by the counter bored cylindrical portion 34, relative movement between the valve members 27 and 35 in the opposite direction being limited by the snap ring 39 carried in the sleeve valve 27.

The lower end of the piston sleeve valve 27 has a thinned edge portion 40 which engages the lower end 19 of the casing 17 to limit downward travel of the sleeve piston under the influence of the spring 32.

In describing the operation of my invention, it is first assumed that the fuel metering regulator device 4 is closed so that the passage of fuel into the conduit 5 is interrupted. When the metering valve device 4 is opened, for instance, by actuation of the throttle lever 4b, fuel is admitted at a metered rate into the conduit 5 and at a predetermined pressure which is determined by the pressure regulating fuel pump 2, and the resistance to fuel discharge by the orifices 10 of the fuel injection nozzles. Since the valve head 37 is yieldably maintained on its seat by the tension of springs 38 and 32 the pressure in the conduit 5 will increase until the pressure of the piston actuator valve spring 38 is overcome. Initially, while the valve head 37 is seated the initial fuel pressure "build up" in the conduit 5 is operative against the smaller area of the head portion 37 until it is sufficient to unseat the piston valve 35.

When the valve head 37 is unseated by the metered fuel and pressure this fuel under pressure is admitted through the fuel inlet port at the valve seat 20 to the larger operative area of the piston actuator valve surrounding the reduced extension. Before this occurs the pressure on the metered fuel has caused initial fuel delivery from the conduit 5 through the communicating conduit 13 and manifold 12 to the primary fuel jet orifices 10 of the dual orifice nozzles or jets 8c and 9c of the gas turbine combustion chambers 8 and 9 and the fuel is ignited and produces an initial combustion chamber pressure. This pressure becomes effective through the conduit 16 and fluid inlet port 33 on the opposite side of the actuating piston valve 35, this pressure being, however, at this time considerably less than the pressure on the entire lower piston actuator valve area. The piston actuator valve 35, due to the increased exposed area to the metered fuel and pressure now moves quickly upward, compressing the spring 38 until the piston actuator valve engages and lifts the sleeve piston valve 27 against the pressure of the stronger spring 32. Upward movement of the sleeve piston valve 27 uncovers the fuel outlet ports 26 and delivers fuel from the conduit 5 to the secondary or main fuel burners 11, through the conduit 15 and manifold 14.

Fuel is now being supplied to the combustion chambers 8 and 9 through both primary and main burners 10 and 11, increasing the combustion chamber pressure to a "working pressure." This working pressure becomes operable on the opposite or upper side of the piston actuator valve tending to move the same downwardly to lower the piston sleeve valve 27 and reduce the area of the fuel outlet ports 25, reducing the amount of fuel supplied through these ports 26 to the main fuel burners 11. The piston actuator valve 35 and the sleeve valve 27 form a fuel supply and combustion chamber balanced valve arrangement in which the amount of fuel supplied to the combustion chamber is balanced against a predetermined combustion chamber pressure.

When the critical predetermined balance is reached between the pressure of the delivered fuel and combustion chamber pressure, fuel is fed into the combustion chamber uniformly through both of the dual fuel injection orifices 10 and 11. The combustion chamber pressure regulates the maximum amount of fuel that is supplied to the main fuel burner 11, also the admission of fuel to the main fuel burner is controlled by the pressure on the fuel supplied to the primary fuel burner. The dual fuel burners are first started when the fuel delivered by the primary fuel jets or orifices is ignited, these jets not being under the control of the automatic valve device, however, no fuel can be supplied to the main fuel orifices until the pressure of the fuel supplied to the primary fuel burner orifices exceeds a predetermined pressure valve sufficient to unseat the piston actuator valve 35.

Having described my invention in connection with one embodiment of a simplified nature, it is obvious that other and more complicated embodiments of my invention, and changes may be made in the arrangement without departing from the spirit of the invention as defined by the accompanying claims.

I claim as my invention:

1. In a fuel flow distributing and manifold pressurizing valve arrangement for dual orifice injection nozzles for combustion chambers for gas turbines; a combustion chamber; a dual orifice injection nozzle therefor having a primary orifice and a secondary orifice; a fuel pump and fuel discharge pressure regulator device having a fuel delivery conduit; a fuel supply conduit connected to the pump and regulator device for supplying fuel thereto; fuel metering regulator means connected to the fuel delivery conduit to receive fuel under pressure therefrom, having a metered fuel outlet; a metered fuel delivery conduit connected to the metered fuel outlet; a primary orifice fuel supply conduit connected between the metered fuel delivery conduit and the primary orifice for delivery of metered fuel from the metered fuel delivery conduit to the primary orifice; a casing having a piston valve cylinder formed therein; a first end closure wall at one end of the cylinder, having a fuel inlet port therethrough connected to said metered fuel delivery conduit; a valve seat surrounding the fuel inlet port having a predetermined fuel inlet area less than the cross sectional area of the cylinder; a second end closure wall for the opposite end of the cylinder; a combustion chamber pressure fluid delivery conduit connected between the interior of the combustion chamber adjacent to the dual orifice fuel injection nozzle and the interior of the cylinder adjacent to the second end closure wall for admitting combustion chamber pressure to the interior of the cylinder adjacent to the second end closure wall; a fuel outlet port formed in the side wall of the cylinder in spaced adjacent relation to the first closure wall; a fluid delivery conduit connected between the fuel outlet port and the secondary orifice of the nozzle for supplying fuel through this outlet port and the second orifice into the combustion chamber; a piston type sleeve valve axially slidable within the cylinder toward the first end closure wall to cover the fuel outlet port in the cylinder wall to interrupt fuel flow to the secondary orifice of the fuel injection nozzle, and movable in the opposite direction toward the second end closure wall to uncover this fuel outlet port to establish communication between the interior of the cylinder intermediate to the piston sleeve valve and the first end closure wall and the secondary orifice; said piston sleeve valve having a fluid port therethrough establishing communication between the interior of the piston sleeve valve and the second end closure wall end of the cylinder; a piston actuator valve axially slidable within the sleeve valve having a predetermined fuel pressure area exposed to fuel pressure in the first closure end wall end of the cylinder which is greater than the operative area of the fuel inlet port valve seat; abutment means on said piston actuator valve for actuating engagement with the piston sleeve valve, incident to movement of the piston actuator valve toward the second closure wall end of the cylinder; a central extension projecting from the operative fuel pressure area of the piston actuator valve toward the fuel inlet port, having a valve head extremity for seating engagement on the valve seat to close the fuel inlet port, formed with a reduced operative pressure area exposed to the fuel inlet pressure through the fuel inlet port when the valve head is seated; first spring means operative between the piston sleeve valve and the second closure end wall tensioning the piston sleeve valve toward the first closure end wall; second spring means operative between the piston sleeve valve and the piston actuator valve urging the piston actuator valve head on the extension into seating engagement with the fuel inlet port valve seat; said first spring means having a greater operative strength than the second spring means; whereby the metered fuel under predetermined pressure, when the metered fuel inlet port is closed by the piston actuator valve head, becomes operative to move the piston actuator valve to unseat the piston actuator valve head and expose the greater operative pressure area of the piston actuator valve to the metered fuel to move the piston actuator valve abutment into actuating engagement with the piston sleeve valve to shift the piston sleeve valve to uncover the fuel outlet port and deliver fuel to the secondary orifice of the fuel injection nozzle, and the combustion chamber pressure becomes effective on the opposite side of the piston actuator valve tending to move the same in the opposite direction to lower the piston sleeve valve to control the full outlet area of the fuel outlet port in a predetermined ratio to the combustion chamber pressure, and the metered fuel pressure effective on the operative pressure areas on one side of the piston actuator valve through the fuel inlet port to balance the combustion chamber pressure on the opposite side of the piston actuator valve and piston sleeve valve, to adjust the piston sleeve valve to control the fuel outlet area of the fuel outlet port in a predetermined ratio to the pressure differential between the pressure of fuel admitted through the fuel inlet port and combustion chamber pressure.

2. A fuel distributing valve device for dual orifice fuel jets of gas turbine combustion chambers comprising a casing having a cylindrical valve chamber therein; an end closure wall closing one end of the chamber having a fuel inlet port therethrough; a valve seat surrounding said fuel inlet port; a fuel outlet port formed in the side wall of the cylindrical valve chamber intermediate its ends; a piston sleeve valve slidably mounted in the cylindrical valve chamber for movement in one direction away from the end closure wall to uncover and open the fuel outlet port and movable in the opposite direction to cover and close the fuel outlet port, said piston sleeve valve having a pressure fluid inlet port therethrough; a piston actuator valve slidable axially within the piston sleeve valve formed with a reduced area extension thereon terminating in a valve head disposed for seating engagement with the fuel inlet port valve seat to close the fuel inlet port when the piston actuator valve is moved toward said end closure wall; spring means between the piston sleeve valve and the casing yieldably urging the piston sleeve valve toward the end closure wall to cover and close the fuel outlet port, spring means between the piston sleeve valve and the piston actuator valve urging the piston actuator valve to move the valve head into seating engagement with the fuel inlet port valve seat to close said fuel inlet port; aligned actuating abutment means between the piston actuator valve and the piston sleeve valve for moving the piston sleeve valve to uncover and open the fuel outlet port incident to predetermine movement of the piston actuator valve extension and valve head away from the end closure wall and fuel inlet port valve seat; said piston actuator valve having a greater operative pressure area located intermediate the reduced pressure area and the piston sleeve valve, adapted to be exposed to the fuel inlet pressure admitted to the cylindrical valve chamber through the fuel inlet port, when the piston actuator valve head leaves the fuel inlet port valve seat, for increasing the inlet fuel pressure on the piston actuator valve to quickly move the same into impinging actuating engagement with the piston sleeve valve to move the piston sleeve valve to uncover and open the fuel outlet port.

3. Apparatus as claimed in claim 2, including a fluid pressure inlet port through the piston sleeve valve to establish communication between the space between the piston sleeve valve and the end of the cylinder opposite the end closure wall and the space between the piston actuator valve and the piston sleeve valve, a closure for the other end of the cylindrical valve chamber, and a pressure fluid inlet conduit disposed in communication with the interior of the cylindrical valve chamber.

4. In a fuel flow distributing and manifold pressurizing valve device for dual orifice injection nozzles, a valve casing having a cylindrical valve chamber therein including opposite end closure walls therefor; a piston sleeve valve slidably mounted in the chamber for reciprocation between the end walls; said chamber having a fuel outlet port therein between the end closure walls adapted to be opened by movement of the piston sleeve valve toward one end closure wall and closed by movement of the piston sleeve valve toward the other end closure wall, the last mentioned end wall having a fuel inlet port therein adapted to be connected to a metered fuel supply; a valve seat of smaller cross sectional area than the cross sectional area of the cylindrical valve chamber, surrounding the fuel inlet port; a combustion chamber pressure fluid pressure supply port in communication with the valve chamber intermediate the other end wall and the piston sleeve valve; said fluid pressure supply port being adapted to be connected to a combustion chamber supplied with fuel by the dual orifice fuel injection nozzles; piston actuator valve means axially slidable within the piston sleeve valve in one direction for actuating engagement with the piston sleeve valve for moving the piston sleeve valve to uncover the fuel outlet port; spring means operative within the cylindrical valve chamber on said piston sleeve valve for moving the piston sleeve valve toward the fuel inlet port; spring means intermediate the piston sleeve valve and the piston actuator valve means for moving the piston actuator valve means out of actuating engagement with the piston sleeve valve means said piston actuator valve means having an operative pressure area exposed to the metered fuel pressure entering the fuel inlet port which is greater than the area of the fuel inlet port at the fuel inlet valve seat, and formed with a concentric extension projecting rigidly from said pressure area toward said fuel inlet port and terminating in a valve head adapted to seat on the fuel inlet port valve seat to close the fuel inlet port; said piston sleeve valve having a combustion chamber pressure fluid supply conduit extending therethrough, establishing communication between the space between the combustion chamber pressure fluid supply port and the space within the piston sleeve valve between the same and the piston actuator valve.

5. In a device of the class described; a combustion chamber; a dual orifice fuel injection nozzle therefor having a primary fuel jet orifice and a main fuel jet orifice; metered fuel supply means; means for supplying fuel under a predetermined pressure to the metered fuel supply means; a casing having a piston cylinder therein closed at its opposite ends by first and second end walls; said first end wall having a fuel inlet port formed therein and a valve seat surrounding the fuel inlet port of smaller operative area than the cross sectional area of the cylinder; a metered fuel outlet port formed in the side wall of the cylinder intermediate the first end wall and the longitudinal center of the axis of the cylinder; a piston type sleeve valve slidable within the cylinder having a port therethrough establishing fluid communication between opposite ends thereof, and a side wall portion closing the fuel outlet port when the sleeve valve is positioned adjacent the first end wall, variably controlling the outlet area of the fuel outlet port when the piston is moved to predetermined positions toward the second end wall, first compression spring means between the second end wall and the sleeve valve yieldably resisting movement of the sleeve valve toward the second end wall and resiliently urging the same toward the first end wall; said sleeve valve having a concentric cylindrical counter bore therein facing the first end wall to provide a piston valve actuator cylinder; an abutment shoulder formed at the inner end of the piston actuator cylinder facing the first end wall; a sleeve valve actuator piston slidably fitting the last mentioned cylinder having a piston head having a concentric valve head extension projecting toward the metered fuel inlet port, and terminating in a valve head disposed for seating engagement with the fluid inlet port valve seat, with the opposite end of the sleeve valve actuator piston disposed in aligned relation to the abutment shoulder; second compression spring means interposed between the sleeve valve and the actuator piston having a lesser strength than the first spring means for resiliently urging the piston actuator toward the first end wall to seat the valve head on the fuel inlet valve seat, and permit predetermined movement of the piston actuator to unseat the inlet valve head before the piston actuator engages the abutment shoulder; metered fuel conduit means between the metered full supply means and the fuel inlet port; primary orifice conduit means between the metered fuel conduit means and the primary fuel jet orifice; conduit means between the metered fuel outlet port and the main fuel jet orifice; and combustion chamber pressure supply conduit means connected between the combustion chamber adjacent the dual orifice fuel injection nozzle and the interior of the piston cylinder between the sleeve valve and the second end wall.

References Cited in the file of this patent

UNITED STATES PATENTS

| | | |
|---|---|---|
| 2,494,714 | Lyman | Jan. 17, 1950 |
| 2,590,853 | Fulton | Apr. 1, 1952 |
| 2,619,162 | Feilden | Nov. 25, 1952 |